United States Patent [19]

Ichida

[11] Patent Number: 5,290,106

[45] Date of Patent: Mar. 1, 1994

[54] ROLLING GUIDE UNIT

[75] Inventor: Tomohiro Ichida, Tokyo, Japan

[73] Assignee: Nippon Thompson Co., Ltd., Minato, Japan

[21] Appl. No.: 40,197

[22] Filed: Apr. 1, 1993

[30] Foreign Application Priority Data

Apr. 2, 1992 [JP] Japan .................................. 108383

[51] Int. Cl.⁵ .................. F16C 29/06; F16C 31/00; F16C 19/00
[52] U.S. Cl. ................................. 384/45; 384/7; 384/48; 384/91
[58] Field of Search .................. 384/25, 7, 9, 43–45, 384/49, 50, 53, 47, 48, 91, 619

[56] References Cited

U.S. PATENT DOCUMENTS 4,384,859  5/1983  Teramachi ........................... 384/45
4,598,956  7/1986  Teramachi ........................... 384/45

FOREIGN PATENT DOCUMENTS 112021  4/1989  Japan .
423233  2/1992  Japan .

Primary Examiner—Thomas R. Hannon
Attorney, Agent, or Firm—Browdy and Neimark

[57] ABSTRACT

In this rolling guide unit, a slide is placed on a track rail so that the slider can be moved slidingly in a linear direction, and a shaft portion is provided on the upper surface of and integrally with the casing of the slider, and has an annular raceway surface on the circumferential side thereof, lower and upper rotary bodies being fitted firmly and rotatably around the shaft portion. The casing constitutes a common part having a function of making a linear movement and a function of making a rotational movement, and this enables the height of the rolling guide unit to be reduced to as great an extent as possible, and an accumulated error due to an assembling operation to be minimized, whereby a highly accurate guide machine can be provided.

5 Claims, 4 Drawing Sheets

ROLLING GUIDE UNIT

BACKGROUND OF THE INVENTION

1. Field of the Invention

This invention relates to a rolling guide unit adapted to be used for the sliding and rotary portions of a machine tool, various kinds of precision machining apparatuses and a testing apparatus.

2. Description of the Prior Art

A conventional linear motion rolling guide unit consists of a track rail having raceway grooves in the longitudinally extending both side surfaces thereof, a slider saddled on the track rail and having raceway grooves, and a plurality of rolling elements adapted to roll between the opposed raceway grooves, an apparatus of comparatively large weight being placed on the slider, the rolling guide unit being adapted to guide highly precise longitudinal movements of the apparatus over a comparatively long distance (refer to Japanese Patent Laid-Open No. 112021/1989).

FIG. 6 is a perspective view of an example of a conventional linear motion rolling guide unit. As shown in FIG. 6, the linear motion rolling guide unit has two rows of parallel-extending track rails 2 fixed on a bed 20, a plurality of sliders 1 moving slidingly on each track rail 2 in a track rail-saddled state, and a slide table 4 fixed on four sliders 1, one of various kinds of apparatuses placed on the slide table 4 being moved linearly in the longitudinal direction of an arrow G. In this linear motion rolling guide unit, the raceway grooves 5 are formed in the longitudinally extending both side surfaces 21 of the track rails 2, and the slider 1 is mounted on the track rails 2 so as to be slidable thereon in a track rail-saddling state (refer to, for example, Japanese Utility Model Laid-Open No. 23233/1992).

The slider 1 described above is formed as shown in, for example, FIG. 7. FIG. 7 is a perspective view showing an example of a conventional linear motion rolling guide unit. The linear motion rolling guide unit consists mainly of a track rail 2 having raceway grooves 5 in the longitudinally extending both side surfaces 21 thereof, and a slider 1 adapted to be moved linearly on the track rail 2. The slider 1 is placed in a saddled state on the track rail 2, and adapted to be slid freely via a plurality of rolling elements 13 circulating along the raceway grooves 5 in the track rail 2. The slider 1 has a casing 3 provided with raceway grooves 54 in the portions thereof which are opposed to the raceway grooves 5, a plurality of rolling elements 13 fitted between the opposed raceway grooves 5, 54 and consisting of a plurality of circulatingly rollable balls, and end caps 6 attached to both of the longitudinal end portions of the casing 3. The end caps 6 are provided with side seals 50 which attain the sealing of the contact portions of the track rail 2 and slider 1, and a grease nipple 55 for supplying a lubricant to slide surfaces between the track rail 2 and slider 1. In order to prevent the rolling elements 13 from falling from the casing 3, retainer straps 51 are fixed to the casing 3 so as to surround the rolling elements 13. Moreover, in order to reliably prevent the rolling elements 13 from falling from the casing 3, lower seals 53 are fixed to the casing 3 so as to seal the casing 3, the longitudinal extending both side surfaces 21 of the track rail 2 and the lower surface of the casing 3.

The rolling elements 13 in a load region which roll between a raceway groove 5 in the track rail 2 and that 54 in the casing 3 are introduced into a switchover passage (not shown) formed in an end cap 6, and then moved into a return passage 52 formed in the upper portion of the casing 3 and extending in parallel with the raceway groove 54, whereby the rolling elements 13 are circulated limitlessly in the endless circulating passage. Thus, owing to the rolling of the loaded rolling elements 13 positioned between the raceway grooved 54 formed in the slider 1 and those 5 formed in the track rail 2, the slider 1 can be moved linearly on the track rail 2 (refer to, for example, Japanese Patent Application No. 326317/1991).

There is a publication disclosing a conventional rotary motion guide unit shown in FIG. 8 in which a bearing is provided. In this rotary motion rolling guide unit, a bearing 28 formed by inserting cylindrical rollers 32 between an inner race 27, which has a V-shaped raceway surface for making relative movement of the rollers 32 thereon, and outer races 16, 17 is incorporated and a rotary body 24 is fixed rotatably to a base 23. In the rotary motion rolling guide unit, the inner race 27 is fixed to the outer circumferential surface 22 of a cylindrical shaft portion 19 of the base 23 with a fixing means, such as a bolt and a clamp. The rotary body 24 is adapted to be rotated relatively to the base 23, and the upper and lower outer races 16, 17 are fixed to the inner circumferential surface 25 of a cylindrical portion 18 of the rotary body 24 with a fixing means, such as a bolt and a clamp. The rolling guide unit is formed by arranging a plurality of cylindrical rollers 32 in an alternately crossing manner between the inner and outer races 27, 16, 17. The inner race 27 is provided on its outer circumferential side with a V-shaped raceway surface 29, and the upper and lower outer races 16, 17 on their inner circumferential sides with raceway surfaces 30, 31 respectively, by which one V-shaped raceway surface is formed.

There is a publication disclosing a linear motion rolling guide unit as a conventional rolling guide unit, on which an apparatus of comparatively large weight is placed as shown in FIG. 6, the guide unit being adapted to guide a linear longitudinal movement of the apparatus over a comparatively long distance. There is also a publication disclosing a pivotal rolling guide unit in which a bearing 28 is incorporated between a base 23 and a rotary body 24 as shown in FIG. 8, with the rotary body 24 fixed to the base 23 rotatably so that the rotary body 24 can be moved relatively to the base 23. When it is necessary that both a linear movement and a rotational movement be made in a rolling guide unit in accordance with the conventional techniques, the above-mentioned linear motion rolling guide unit and rotary motion rolling guide unit are combined so that both of these movements can be made.

However, a rolling guide unit having construction which enables both a linear movement and a rotational movement to be made simultaneously has not been developed up to the present time. In a conventional structure in which a linear motion guide unit and a rotary motion rolling guide unit are combined, the dimensions of the guide unit increases to a high level, and the height thereof becomes excessively large, or an accumulated error due to the guide unit-combining operation increases. Thus, it is impossible at present to provide a highly accurate rolling guide unit.

SUMMARY OF THE INVENTION

A primary object of the present invention is to solve these problems and provide a rolling guide unit consisting of parts which serve as common parts for making both a linear movement and a rotational movement so that a linear movement and a rotational movement can be made simultaneously, capable of being formed to small dimensions, capable of reducing the height thereof to as great an extent as possible, capable of minimizing an accumulated error which is ascribable to a guide unit combining operation, and capable of making linear and rotational movements with a high accuracy.

Another object of the present invention is to provide a rolling guide unit comprising a track rail provided with first raceway grooves in the longitudinally extending both side surfaces thereof; a slider saddled on the track rail and capable of being linearly moved, provided with second raceway grooves opposed to the first raceway grooves, and consisting of a casing in which the second raceway grooves are formed, end caps fixed to both of the longitudinal end portions of the casing, side seals disposed in contact with the end caps, and first rolling elements circulatingly rollable between the first and second raceway grooves; a cross-sectionally circular shaft portion formed integrally with the casing so as to project from the upper surface thereof and provided on its circumferential side with inner upper and lower raceway surfaces which are inclined inward toward each other so as to form a cross-sectionally V-shaped recess; a lower rotary body fitted rotatably around the cross-sectionally circular shaft portion and provided with an outer lower raceway surface opposed with respect to its circumference to the inner lower raceway surface; an upper rotary body placed fixedly on the lower rotary body, fitted rotatably around the cross-sectionally circular shaft portion, and provided with an outer upper raceway surface opposed with respect to its circumference to the inner upper raceway surface; and second rolling elements adapted to roll between the inner upper and lower raceway surfaces and outer lower and upper raceway surfaces.

This rolling guide unit is provided with a cross-sectionally circular shaft portion which is formed on the upper surface of and integrally with a slider linearly sliding on a track rail, and upper and lower raceway surfaces are provided on the circumferential side of the shaft portion so as to define a cross-sectionally V-shaped recess, lower and upper rotary bodies being mounted on the shaft portion so that these rotary bodies can be rotated via rolling elements. Therefore, the slider constitutes a common part having two functions of making both a linear sliding movement and a rotational movement. This enables the height of the rolling guide unit to be reduced to as great an extent as possible, the number of parts thereof to be minimized and an accumulated assembling error to be reduced, whereby a highly accurate guide machine can be provided.

Consequently, unlike a conventional rolling guide unit, the rolling guide unit according to the present invention does not require an operation for combining a linear motion rolling guide unit with a rotary motion rolling guide unit. This enables the number of parts to be assembled to be reduced, and an accumulated assembling error to be minimized, so that a highly accurate rolling guide unit can be provided. Since the slider has a common function of making both a linear movement and a rotational movement, the height of the guide unit can be reduced to as great an extent as possible, whereby it becomes possible to produce a compact guide unit.

DESCRIPTION OF THE PREFERRED EMBODIMENTS

Figure 1:
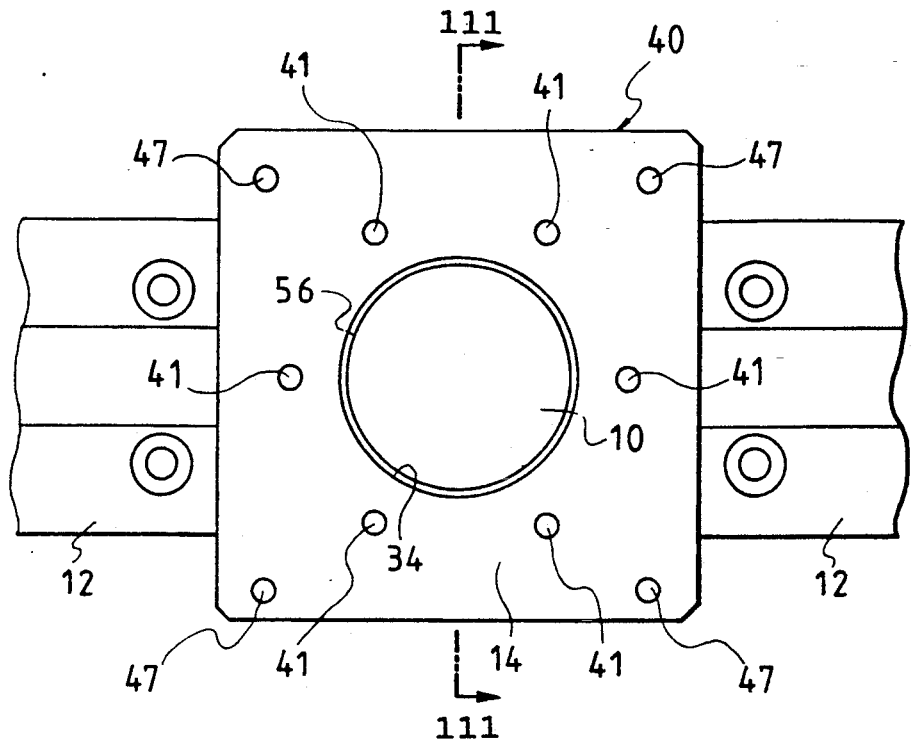
FIG. 1 is a plan view of an embodiment of the rolling guide unit according to the present invention.
Figure 2:
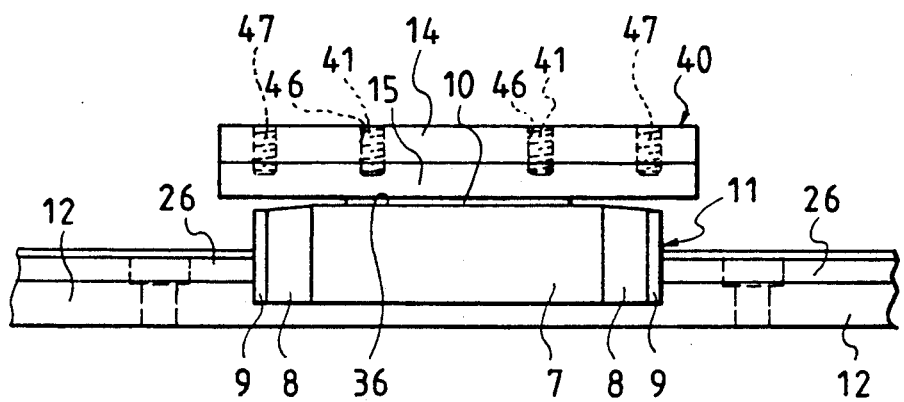
FIG. 2 is a side elevation of the rolling guide unit of FIG. 1.
Figure 3:
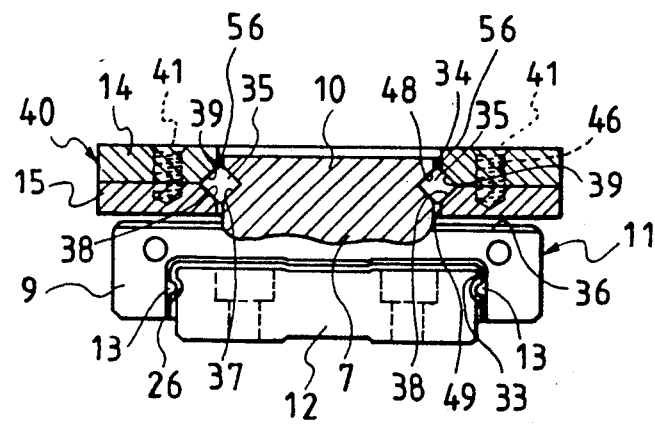
FIG. 3 is a sectional view taken along the line A—A in FIG. 1.

The embodiments of the rolling guide unit according to the present invention will now be described with referent to the drawings. An embodiment of the rolling guide unit according to the present invention will be described with reference to FIGS. 1, 2 and 3.

Figure 7:
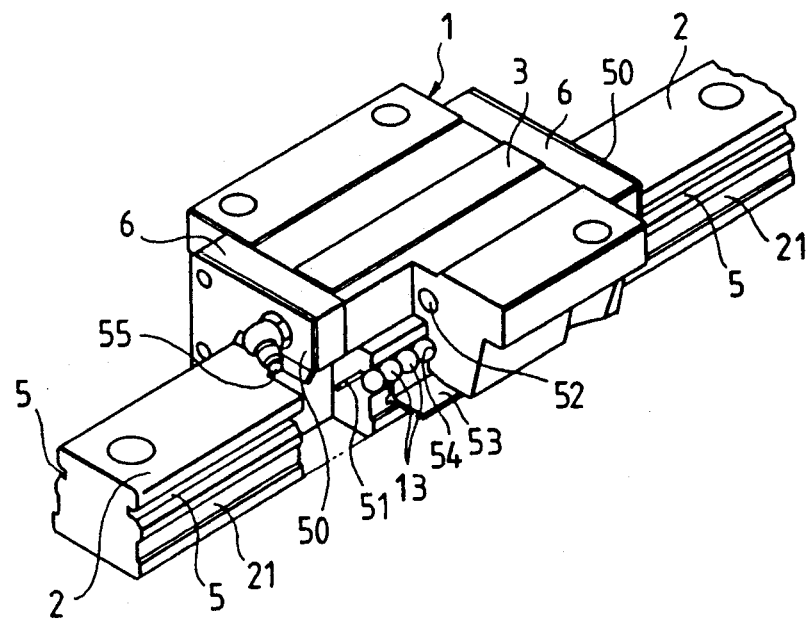
FIG. 7 is a perspective view of another example of a conventional linear motion rolling guide unit.
Figure 8:
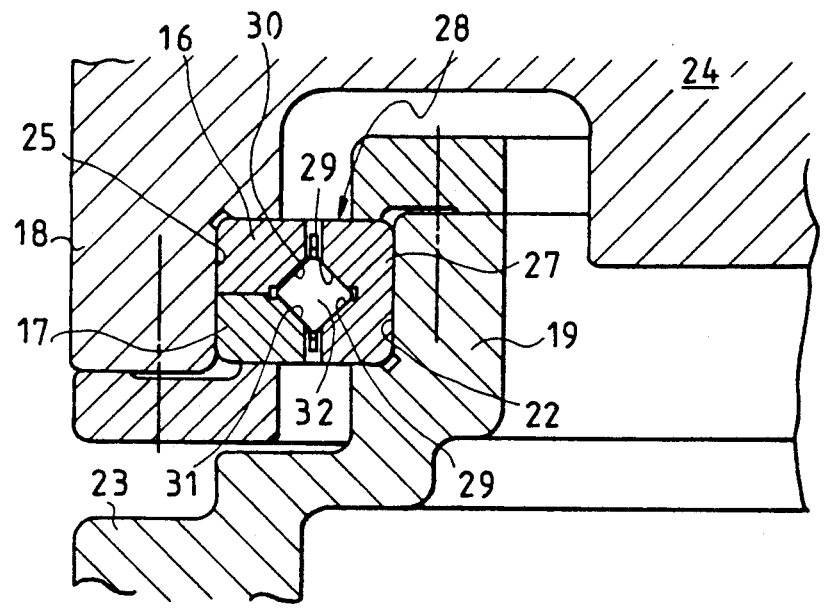
FIG. 8 is a sectional view of an example of a conventional rotary motion rolling guide unit with a bearing incorporated therein.

This rolling guide unit has a track rail 12 fixed on a bed or a base, a slider 11 saddled slidably on the track rail 12, a lower rotary body 15 fixed rotatably to the slider 11, and an upper rotary body 14 fixed on the lower rotary body 15. The track rail 12 is provided with raceway grooves 26 in both of the longitudinally extending side surfaces thereof. The slider 11 has the same construction as the slider 1 in the linear motion rolling guide unit shown in FIG. 7, and is provided with a casing 7, end caps 8 attached to both end surfaces of the casing 7 with respect to the sliding direction thereof, and side seals 9 fixed to the end surfaces of the end caps 8. The casing 7 is further provided with raceway grooves 33, which are opposed to the raceway grooves 26 in the track rail 12, in the inner surfaces with respect to the sliding direction thereof. A plurality of rolling elements 13 consisting of balls or cylindrical rollers are inserted rollably in raceways formed between the raceway grooves 26 in the track rail 12 and those 33 in the casing 7.

Lower seal members (designated by a reference numeral 53 in FIG. 7) for effecting the sealing of the portions between the track rail 2 and casing 7, and retainer straps (designated by a reference numeral 51 in FIG. 7) for preventing the rolling elements 13 from falling from the casing 7 are fixed to the casing 7 so as to surround the rolling elements 13. Side seals 9 for effecting the sealing of the portions between the track rail 12 and slider 1, and grease nipples (designated by a reference numeral 55 in FIG. 7) for supplying a lubricant to the slide surfaces between the track rail 12 and slider 1 are provided on the end caps 8. The end caps 8 are attached to both end surfaces of the casing 7 by inserting screws into a plurality of holes made therein, and provided in the lower surfaces thereof with recesses through which the track rail 12 is inserted with the end caps saddled thereon, switchway passages (not shown) for changing the direction of movements of the rolling elements 13 and circulating the same being formed at both sides of the end caps 8.

In this rolling guide unit, the casing 7 for the slider 11 is provided with a cross-sectionally circular shaft portion 10 consisting of a cross-sectionally circular projection which extend from the upper surface 36 of the casing 7, and which is formed integrally with the casing 7. This shaft portion 10 is provided in its circumferential side surface with inner upper and lower raceway surfaces 48, 37 which define a cross-sectionally V-shaped recess. A rotary body unit 40 placed on the slider 11 consists of upper and lower rotary bodies 14, 15. The upper rotary body 14 in the rotary body unit 40 is provided with a through bore 34 in the central portion thereof, and the lower rotary body 15 a through bore 49 in the central portion thereof. The cross-sectionally circular shaft portion 10 is fitted in a rotatably passed state in the through bores 34, 49 in the upper and lower rotary bodies 14, 15.

The upper rotary body 14 is provided with a plurality of bores 46 spaced in the circumferential direction of the through bore 34, and screws 41 are inserted into the lower rotary body 15 through these bores 46, whereby the upper and lower rotary bodies 14, 15 are fixed to each other. An object to be placed on the upper rotary body 14 is fixed thereto by tighetning fixing means 47, such as hexagonal hole-carrying bolts, screws or rivets in fixing portions consisting of threaded holes formed in the upper rotary body 14.

The through bore 34 formed in the upper rotary body 14 is provided on the lower circumferential portion thereof with an outer upper raceway surface 39 opposed with respect to the circumferential direction thereof to the inner upper raceway surface 48. The through bore 49 formed in the lower rotary body 15 is provided on the upper circumferential portion thereof with an outer lower raceway surface 38 opposed with respect to the circumferential direction thereof to the inner lower raceway surface 37. A plurality of rolling elements 35, such as cylindrical rollers or balls are arranged in an alternately crossing manner in an annular raceway formed between the raceway surfaces 48, 37 of the cross-sectionally circular shaft portion 10 and the raceway surfaces 39, 38 of the upper and lower rotary bodies 14, 15. For example, when the rolling elements 35 consist of cylindrical rollers, they are composed of first cylindrical rollers adapted to be rolled between the inner upper raceway surface 48 and outer lower raceway surface 38, and second cylindrical rollers adapted to be rolled between the inner lower raceway surface 37 and outer upper raceway surface 39, and the first and second cylindrical rollers are arranged in an alternately crossing state. A seal member 56 can be provided in a clearance between the outer circumferential surface of the shaft portion 10 and the circumferential surface of the through bore 34 in the upper rotary body 14 so as to prevent extraneous matter, such as water and dust from entering via this clearance.

Since the rotary body unit 40 in this rolling guide unit is divided into the upper and lwoer rotary bodies 14, 15, the rolling elements 35 can be arranged between the raceway surfaces 37, 48 of the shaft portion 10 and that 38 of the lower rotary body 15 after the lower rotary body 15 has been fitted at the through bore 49 therein around the shaft portion 10 of the casing 7. When the upper rotary body 14 is then fitted at the through bore 34 therein around the shaft portion 10 with the upper and lower rotary bodies 14, 15 thereafter combined with each other firmly with screws 41, the rotary body unit 40 can be set on the casing 7. Since a load is placed firmly on the upper surface of the rotary body unit 40, female screws 47 are formed as necessary in the rotary body unit 40.

In this rolling guide unit, the rolling elements 13 moving in the raceway grooves 26 in the track rail 12 roll in the raceway grooves 33 in the casing 7 and are introduced into the switch-way passages in the end caps 8, the rolling elements 13 being then moved to the return passage (designated by a reference numeral 52 in FIG. 7) formed in parallel with the raceway grooves 33 in the casing 7, whereby the rolling elements 13 are circulated limitlessly in the endless circulating passage. Accordingly, the slider 11, which is set in a saddling state on the track rail 12, can be moved on the track rail 12 slidingly and reciprocatingly in the linear direction in an unrestricted manner via the rolling elements 13 rolling circulatingly along the raceway grooves 26 in the track rail 12.

The casing 7 is provided at the central part thereof with the cross-sectionally circular shaft portion 10 extending upward and formed integrally with the casing 7, and annular raceway surfaces 37, 48 which define a cross-sectionally V-shaped recess in the endless raceway, are formed on the circumferential side of the shaft portion 10. In other words, the shaft portion 10 constitutes an inner race of a conventional bearing. The shaft portion 10 is provided with the rotary body unit 40 consisting of the upper and lower rotary bodies 14, 15 and fitted firmly therearound. Moreover, the upper and lower rotary bodies 14, 15 are provided with raceway surfaces 39, 38 respectively, which form an annular raceway opposed to the raceway surfaces 37, 38. In other words, the upper and lower rotary bodies 14, 15 constitute an outer race of a conventional bearing. Rolling elements 35 consisting of cylindrical rollers or balls are provided in the annular raceway defined by the raceway surfaces 37, 38, 39, 48. Therefore, the rotary body unit 40 consisting of the upper and lower rotary bodies 14, 15 can be rotated relatively to the casing 7.

In this rolling guide unit, the casing 7 constitutes one part which makes a sliding movement, owing to the cross-sectionally circular shaft 10 formed integrally with the casing 7, and the other part which makes a rotational movement, owing to the shaft portion 10 formed so as to serve s an inner race of a bearing. Accordingly, the casing 7 constitutes a part used both as a part making a linear movement and as a part making a rotational movement. This enables the rolling guide unit to make both a linear movement and a rotational movement simultaneously, the dimensions thereof to be minimized, the height thereof to be reduced to as great an extent as possible, an accumulated error due to an assembling operation to be reduced, and the rotational and linear movements thereof to be made with a high accuracy.

Figure 4:
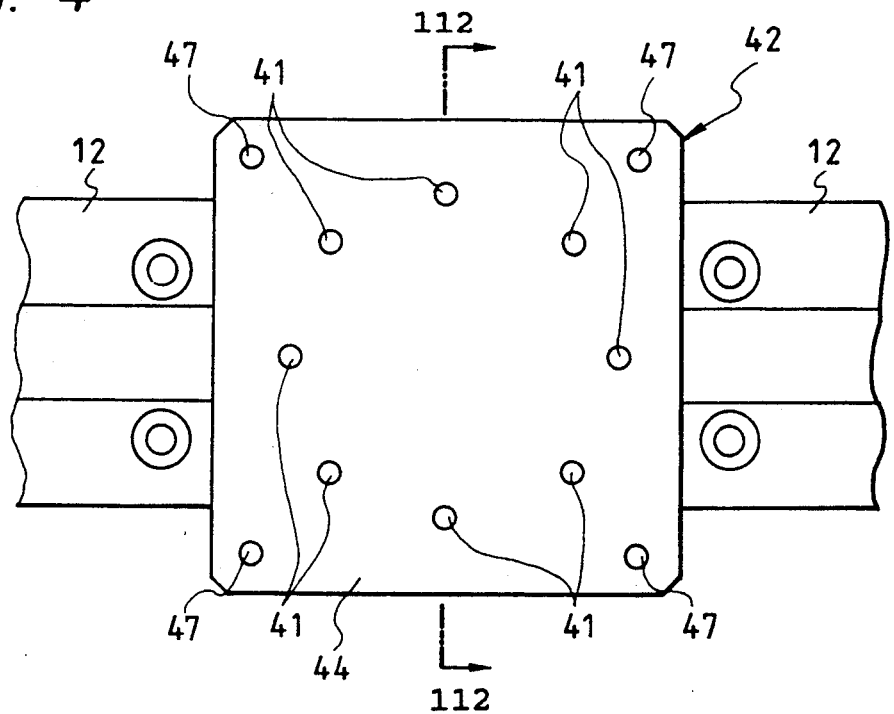
FIG. 4 is a plan view of another embodiment of the rolling guide unit according to the present invention.
Figure 5:
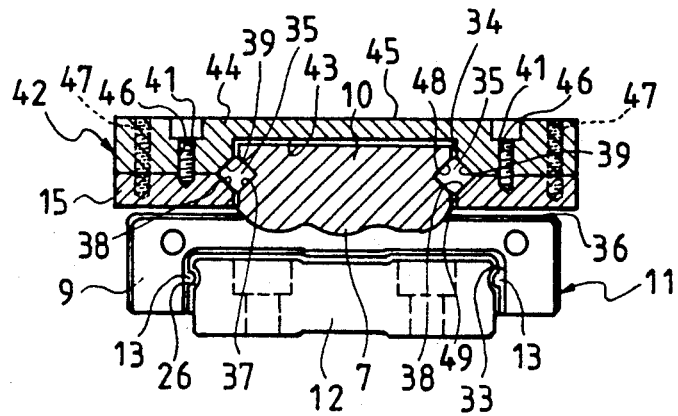
FIG. 5 is a sectional view taken along the line B—B in FIG. 4.
Figure 6:
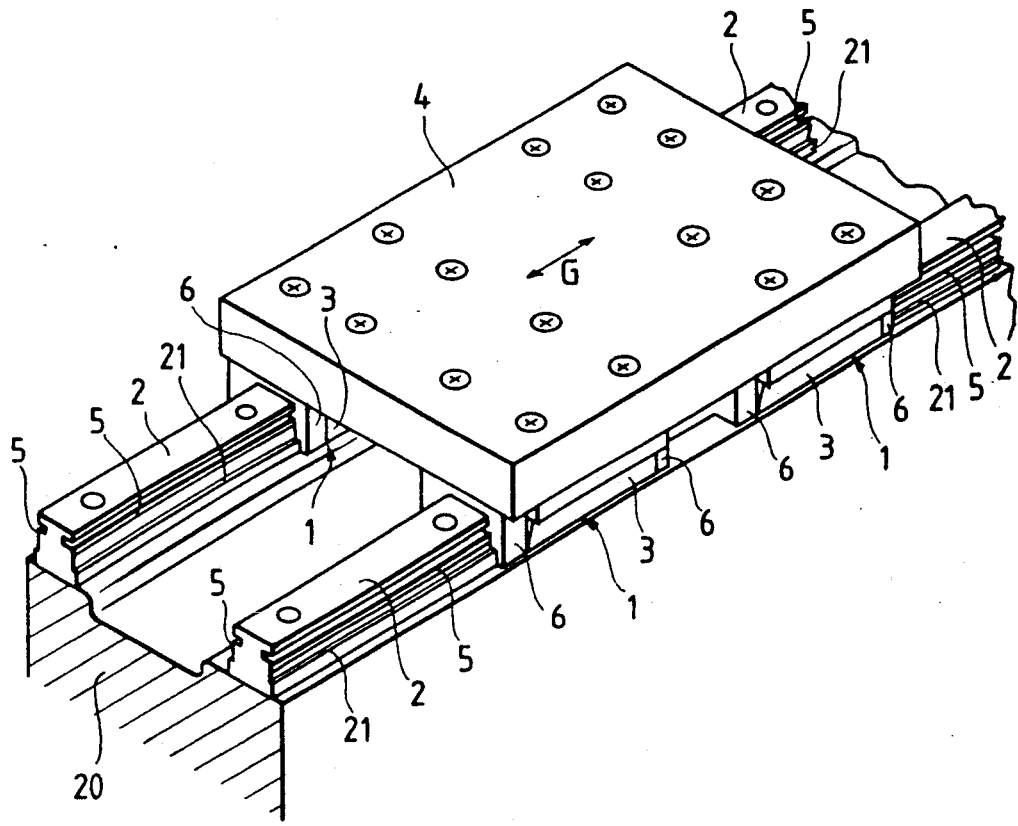
FIG. 6 is a perspective view of an example of a conventional linear motion rolling guide unit.

Another embodiment of the rolling guide unit according to the present invention will now be described with reference to FIGS. 4 and 5. Since the construction and function of this embodiment are identical with those of the previously-described embodiment except the construction of the upper rotary body of the former, the same parts are designated by the same reference numerals, and duplicate descriptions thereof are omitted.

In this embodiment, an upper rotary body 44 constituting an rotary body unit 42 is provided with a circular recess 43 in which a cross-sectionally circular shaft portion 10 provided on a casing 7 is fitted. The upper rotary body 44 is further provided with a plurality of bores 46 in the portions thereof which are equidistantly outwardly away from the outer circumference of the shaft portion 10, and screws 41 are driven into a lower rotary body 15 through these bores 46 so as to firmly combine the upper rotary body 44 and lower rotary body 15 with each other. Therefore, the upper surface 45 of the upper rotary body 44 can be formed flat in a closed state. Since the upper surface 45 of the upper rotary body 44 is not provided with through bores which are formed in the previously-described embodiment, the degree of freedom of a part to be placed on the upper surface of the upper rotary body increases, so that this upper surface 45 can be effectively utilized.

What is claimed is:

1. A rolling guide unit comprising:
   a track rail provided with first raceway grooves in the longitudinally extending both side surfaces thereof,
   a slider saddled on said track rail, capable of being linearly moved, and consisting of a casing having second raceway grooves in the portions thereof which are opposed to said first raceway grooves, end caps fixed to both of longitudinal end portions of said casing, and first rolling elements circulatingly rollable between said opposed first and second raceway grooves,
   a cross-sectionally circular shaft portion formed integrally with said casing so as to project from the upper surface thereof and provided on the circumferential side thereof with an inner upper raceway surface and an inner lower raceway surface adjacent to said inner upper raceway surface,
   a lower rotary body fitted rotatably around said cross-sectionally circular shaft portion and provided with an outer lower raceway surface opposed with respect to the circumference thereof to said inner lower raceway surface,
   an upper rotary body placed fixedly on said lower rotary body, fitted rotatably around said cross-sectionally circular shaft portion and provided with an outer upper raceway surface opposed with respect to the circumference thereof to said inner upper raceway surface, and
   second rolling elements adapted to roll between said inner upper and lower raceway surfaces and said outer lower and upper raceway surfaces.

2. A rolling guide unit according to claim 1, wherein said inner upper and lower raceway surfaces formed on the circumferential side of said cross-sectionally circular shaft portion form a cross-sectionally V-shaped recess, and said second rolling elements consist of first cylindrical rollers rolling between said inner upper raceway surface and said outer lower raceway surface, and second cylindrical rollers rolling between said inner lower raceway surface and said outer upper raceway surface, said first and second cylindrical rollers being arranged in an alternately crossing state.

3. A rolling guide unit according to claim 1, wherein said upper rotary body is provided with a through bore in which said cross-sectionally circular shaft portion is fitted.

4. A rolling guide unit according to claim 1, wherein a clearance between the outer circumferential surface of said cross-sectionally circular shaft portion and the inner circumferential surface of said through bore in said upper rotary body is provided therein with a seal member for preventing the entry thereinto of extraneous matter.

5. A rolling guide unit according to claim 1, wherein said upper rotary body is closed at the upper surface thereof and provided with a circular recess in which said cross-sectionally circular shaft portion is fitted.

* * * * *